United States Patent
Hofbeck et al.

(10) Patent No.: US 7,209,033 B2
(45) Date of Patent: Apr. 24, 2007

(54) DEVICE AND METHOD FOR DETECTING AN OBJECT OR A PERSON ON A SEAT OF VEHICLE

(75) Inventors: Klaus Hofbeck, Neumarkt (DE); Lorenz Pfau, Regensburg (DE); Birgit Rösel, Regensburg (DE)

(73) Assignee: Siemens Aktiengesellschaft, München (DE)

( * ) Notice: Subject to any disclaimer, the term of this patent is extended or adjusted under 35 U.S.C. 154(b) by 306 days.

(21) Appl. No.: 10/931,402

(22) Filed: Sep. 1, 2004

(65) Prior Publication Data

US 2005/0062595 A1  Mar. 24, 2005

Related U.S. Application Data

(60) Provisional application No. 60/544,796, filed on Feb. 14, 2004.

(30) Foreign Application Priority Data

Sep. 9, 2003  (DE) ................. 103 41 578

(51) Int. Cl.
    *B60Q 1/00*  (2006.01)
(52) U.S. Cl. ............. 340/457.1; 340/457; 340/573.1; 180/287

(58) Field of Classification Search ............ 340/457, 340/457.1, 573.1, 426, 439; 180/271, 286, 180/287, 289; 280/735
See application file for complete search history.

(56) References Cited

U.S. PATENT DOCUMENTS

| | | | |
|---|---|---|---|
| 5,413,378 A | 5/1995 | Steffens, Jr. et al. | |
| 5,626,359 A | 5/1997 | Steffens, Jr. et al. | |
| 5,877,707 A * | 3/1999 | Kowalick | 340/988 |
| 6,099,030 A | 8/2000 | Kraft | |
| 6,199,904 B1 * | 3/2001 | Dosdall | 280/735 |
| 6,215,395 B1 * | 4/2001 | Slaughter et al. | 340/457.1 |
| 6,540,040 B1 * | 4/2003 | Patel | 180/269 |
| 2002/0008615 A1 | 1/2002 | Heide et al. | |
| 2003/0038719 A1 * | 2/2003 | Mattes et al. | 340/541 |
| 2003/0136600 A1 | 7/2003 | Breed et al. | |
| 2005/0280556 A1 * | 12/2005 | Hofbeck et al. | 340/937 |

FOREIGN PATENT DOCUMENTS

| | | |
|---|---|---|
| DE | 196 10 833 A1 | 9/1996 |
| DE | 196 37 108 A1 | 3/1998 |
| DE | 101 24 915 A1 | 12/2002 |
| DE | 101 33 759 C2 | 1/2003 |

* cited by examiner

*Primary Examiner*—Daniel Wu
*Assistant Examiner*—Travis Hunnings
(74) *Attorney, Agent, or Firm*—Laurence A. Greenberg; Werner H. Stemer; Ralph E. Locher (57) ABSTRACT

The device has a transceiver which transmits high-frequency signals, which are reflected back by reflectors in the seats. Occupied seats are detected on the basis of signal propagation delays and/or reflector detections and/or receiving intensities. In addition, it is possible to detect with the aid of a belt sensor whether or not a safety belt is fastened.

15 Claims, 5 Drawing Sheets

DEVICE AND METHOD FOR DETECTING AN OBJECT OR A PERSON ON A SEAT OF VEHICLE

CROSS-REFERENCE TO RELATED APPLICATION

This application claims the benefit under, 35 U.S.C. § 119(e), of copending provisional patent application No. 60/544,796, filed Feb. 14, 2004; this application also claims the international priority, under 35 U.S.C. § 119, of German patent application No. 103 41 578.5, filed Sep. 9, 2003; the prior applications are herewith incorporated by reference in their entirety.

BACKGROUND OF THE INVENTION

Field of the Invention

The invention relates to a device and a method for detecting an object or a person on a seat of a vehicle, i.e., of a means of transport, in order to control vehicle functions for example.

A prior art device, as described in U.S. Pat. No. 6,199,904 B1, comprises a transceiver with a high-frequency transmitter and a high-frequency receiver. The transmitter transmits high-frequency radiation to a vehicle seat having a reflecting surface. The radiation is reflected by the surface and transmitted to the receiver. The receiver receives the reflected signals and evaluates the intensity of the received signals. In the event that a person is sitting on a seat, the signals are significantly attenuated by the body that it is immediately possible to detect a person located on the seat.

That device cannot, however, differentiate between whether the reflected signals originate from the seat surface or from another reflecting element. Consequently seat occupancy cannot be detected with complete certainty.

Within our company-internal research and development work, it has been suggested using a transceiver of an access control system and vehicle start system as a transceiver. The distance between the transceiver and reflector can be determined based on the delay of the signals. The knowledge of the location and the position of the seat allows the signals reflected by the reflector to be differentiated from the other stray signals and on the basis of the intensity of the received signals, it is possible to determine with certainty whether or not a person is seated on a seat.

German Patent DE 101 33 759 C2 discloses a device for controlling the belt guide of the seat belt. Image processing and pattern recognition detect the number of occupants present and/or which seats are occupied, the occupants' posture, head position, ear and mouth position. The image processing and pattern recognition also detect the occupants (occupant identification). The image processing and pattern recognition also detect the operation of the belt. On the basis of the known posture, head position, and the belt operation, the pattern recognition determines whether a potential danger is effected by the belt operation.

One disadvantage of these known devices is that they operate purely optically and the optical shadowing or covering cannot determine whether or not a person is actually seated on a vehicle seat. In addition, the optical image processing is extremely costly.

A further device for detecting seat occupancy is described in patent application publication US 2003/0136600 A1. The device is used to detect the state of health of a person sitting on a seat. For seat occupancy detection it has a transmitter which transmits ultrasound signals. The waves reflected off the object are received by receivers and compared with the reference patterns. Subsequently it can be determined whether the seat is occupied and by which object. The information received is used to control the airbag. Furthermore, by way of example, the seat position can be detected. In addition, resonators are arranged at different positions on the seat. The signals reflected back by the resonators are received by receivers and analyzed. This enables an accurate detection of the seat position which can then be stored in the seat memory. These reflectors do not serve however to detect persons or objects on the seat, but merely to detect and record the position of the seat.

Belt sensors can also be present in the known device, whereby the location of the belt can be determined and whether or not the belt is in use. This information ensures a more accurately controlled triggering of the airbag.

Another device (cf. German published patent application DE 101 24 915 A1 and corresponding US 2003/0038719) is used to define the occupancy state of a seat. It has a transmitter which transmits high-frequency signals to a receiver. The received power depends on whether a person is located between the transmitter and receiver, his/her size being measured and analyzed. A device of this kind has neither reflectors nor belt sensors in order to detect a person and to detect whether or not they are belted in.

A further device (cf. German published patent application DE 196 37 108 A1 and corresponding to U.S. Pat. No. 6,099,030) comprises an occupancy protection system for motor vehicles, wherein the seat position of occupants is continuously monitored. In addition, a distance measuring device is provided which transmits signals which are reflected by reflectors off the safety belt. Only the distances between the reflectors and the transmitter and/or receiver are measured here. The radiation does not go through the body or the object located on the seat.

German published patent application DE 196 10 833 A1 and corresponding U.S. Pat. Nos. 5,626,359 and 5,413,378 disclose a device for controlling a restraint system comprising different sensors, by means of which the position of a person on a seat is detected. In addition, the ultrasound sensors radiate the seat area and record the echo signals. The position of an occupant can be detected relative to each of the sensors by monitoring the duration between the transmitted impulses and the received echo impulses. The position of an occupant on a seat is detected depending on all of this determined information, and the airbag is correspondingly controlled.

That prior art device uses what is known as an impulse radar, which operates according to the Doppler principle and evaluates echo signals. No consideration is paid here to the radiation guided through the body of a person on the seat or through an object. Impulse radar methods of this type are extremely prone to errors since unwanted reflections off any object in the motor vehicle could lead to faulty measurements.

SUMMARY OF THE INVENTION

It is accordingly an object of the invention to provide a device and method for detecting objects on a vehicle seat, which overcomes the above-mentioned disadvantages of the heretofore-known devices and methods of this general type and which renders it possible to detect with full certainty which seats are occupied and whether or not the person or object positioned thereon is also strapped in using a safety belt.

With the foregoing and other objects in view there is provided, in accordance with the invention, a device for detecting an object on a seat of a vehicle, the device comprising:

at least one high-frequency transmitter disposed in vicinity of the seat and configured to transmit high-frequency signals;

one or a plurality of reflectors for reflecting high-frequency signals disposed in or on the seat to cause the high-frequency signals to traverse an object on the seat at least partially attenuated;

a high-frequency receiver disposed to receive the high-frequency signals;

an evaluating unit connected to the high-frequency transmitter and to the high-frequency receiver and configured to detect an occupancy of the seat from at least one of a signal propagation delay between transmitting and receiving, information contained in the high-frequency signals, and a received signal strength;

a safety belt disposed to secure the object on the seat; and a belt sensor connected to the evaluating unit, the belt sensor enabling a detection whether or not the safety belt has been fastened.

With the above and other objects in view there is also provided, in accordance with the invention, a method of detecting an object on a seat of a vehicle. The method comprises the following steps:

transmitting high-frequency signals with a high-frequency transmitter and receiving the signals with a high-frequency receiver and causing the high-frequency signals to at least partially traverse the object located on the seat and to thereby attenuate the signal;

determining an occupancy of the seat from at least one item of information consisting of a signal propagation delay between transmitting and receiving, an information contained in the high-frequency signals, and a signal strength of a received signal; and detecting from a belt sensor signal whether or not the seat belt is fastened if the seat has been determined to be occupied.

The device according to the invention comprises one or a plurality of high-frequency transmitters which are arranged in the interior of the vehicle and transmit high-frequency signals. One or a plurality of reflectors is arranged in or on each particular seat. The reflectors reflect the received high-frequency signals back to a high-frequency receiver. The high-frequency receiver demodulates the signals and routes them on to an evaluating unit, where it is determined, on the basis of the signal propagation delay of the signals and/or the codes contained in the high-frequency signals and/or the received signal intensity, whether or not a seat is occupied. Furthermore, with the aid of a belt sensor, it is possible to detect whether or not a safety belt is actually being worn and whether or not the person or the object on the seat is fastened in.

The advantage of this device is that it can independently and precisely detect which seats are occupied and whether or not the safety belts in these seats are being worn.

High-frequency transmitters or high-frequency receivers can also be arranged in the seats in place of reflectors, wherein a unidirectional transmission is effected between the high-frequency transmitter and the high-frequency receiver, these being arranged in such a way that the object or the person is definitely positioned within the radiation flow.

The reflectors can send the high-frequency signals back modulated, with information characteristic to that particular reflector. In this way, it is easy to detect from which reflector the received signal originates. The actual position of the reflector can be determined based on the signal propagation delay (the actual position depends among other things on the position of the seat and the inclination of the seat rest). Furthermore it is possible to monitor whether or not the received signal has taken a detour on its way from the transmitter via the reflector to the receiver, in other words by means of multiple reflection. This device alone also permits the detection of seat occupancy.

A simple switch can be used as a belt sensor, said switch being arranged in the belt buckle in such a way that it detects whether or not a safety belt is fastened, thereby securing the person or the object on the seat.

One or a plurality of belt reflectors can be used as belt sensors, said belt reflectors issuing the high-frequency signal with information or an identifier. Together with the received intensity for example, it is possible to determine whether or not the belt is fastened.

A more user-friendly design is achieved by equipping the belt sensor with one or a plurality of belt reflectors which are arranged on or in the safety belt. A three-dimensional representation of the safety belt can be determined by means of a plurality of reflectors arranged on the safety belt with the aid of the distance measurement. It is possible to detect from this whether or not a safety belt is fastened and the extent thereof. It is therefore also possible to detect for example, how far a person in the seat, who is fastened in with a seat belt, moves away from the seat.

The high-frequency transmitter and high-frequency receiver are configured adjacent to one another as one entity, known as a transceiver, or in a unit or in a housing. The transceiver can also be used for an access control system and motor vehicle start system (anti-theft device) which is in any case present, since high-frequency signals are also transmitted and received there, the distance/position of a code transmitter being determined with the aid of a delay measurement. Reference should be expressly made here to an antitheft device of this type and to the elements thereof as disclosed in German patent application DE 199 57 536 A1 and its corresponding patent application publication US 2002/0008615 A1, which are herewith incorporated by reference. More detailed knowledge of an antitheft device of this kind is hence available to those of skill in the art.

The reflectors can be designed as modulating reflectors, wherein a receiving signal can be sent back modulated by a code, for example with the aid of a SW element (surface wave). Other possibilities for modulated reflection of the high-frequency signal are also possible. With the aid of the modulation, the signal to the high-frequency receiver is also given a characteristic identifier.

If the device is connected to an evaluating and display unit, a supervisor can easily and quickly be shown which seats are occupied or unoccupied, and which safety belts are fastened and which are not.

The reflectors can be used not only for detecting the seat occupancy, but also for example to determine the actual current position of the seat or the actual position of the person on the seat. The determined position can then be routed to a vehicle control system, for example to an airbag system. The determined position of the person and the seats can also be provided for other control devices, by means of which the vehicle functions can be controlled in a user-friendly manner (user-specific adjustment of the seats, adjustment of the mirrors in the motor vehicle, air conditioning system, fans, internal light etc.). Immobilizers can also be triggered whereby the means of transport can only be used (i.e., starting and moving away) if all the persons in the means of transport and the objects to be protected are secured by the safety belts.

Advantageously the high-frequency receiver is used to determine the current position of a person on a vehicle seat and to route this position to an airbag system in a motor vehicle, wherein the triggering of the airbag can be controlled in the event of an accident. Since an airbag system is a critical safety system for a person, it is important that the reflectors operate correctly and can be examined at any time, and are not permitted to fail.

It is advantageous if the high-frequency transmitter transmits the signals in broadband modulated form and each reflector or group of reflectors reflect their signals at a predetermined frequency. An individual high-frequency transmitter can be assigned to a reflector or a high-frequency receiver in the seating area to detect the fastened seat belt. A plurality of seats can be radiated with the high-frequency signals by each high-frequency transmitter in order to detect the seat occupancies and the fastened seat belts.

The use of a plurality of high-frequency transmitters enables signals to be transmitted in different transmission channels, at different carrier frequencies, with a frequency multiplex method, a time multiplex method, or a combined multiplex method (i.e. section by section depending on the time and/or frequency), in order to avoid as far as possible unfavorable signal overlapping with the return signals to the high-frequency receiver.

The reflectors can also send the signals back in different polarized forms. If the high-frequency receiver can receive different polarized signals, one transmitter can be used for a plurality of seats with reflectors, in order to be able to distinguish between the individual reflectors. Thus for example, linearly polarized signals with different polarization directions or elliptically polarized signals can be generated.

A device according to the invention is preferably used in a motor vehicle to monitor all the seats in the motor vehicle and to determine whether or not all persons in the vehicle are strapped-in. A device with a plurality of high-frequency transmitters can be used in a bus to show the driver at one glance whether or not all of the passengers have fastened their safety belts. The same can also be applied to aircraft, passenger ships or rail vehicles.

Other features which are considered as characteristic for the invention are set forth in the appended claims.

Although the invention is illustrated and described herein as embodied in a device and method for detecting an object or a person on a seat of a means of transport, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
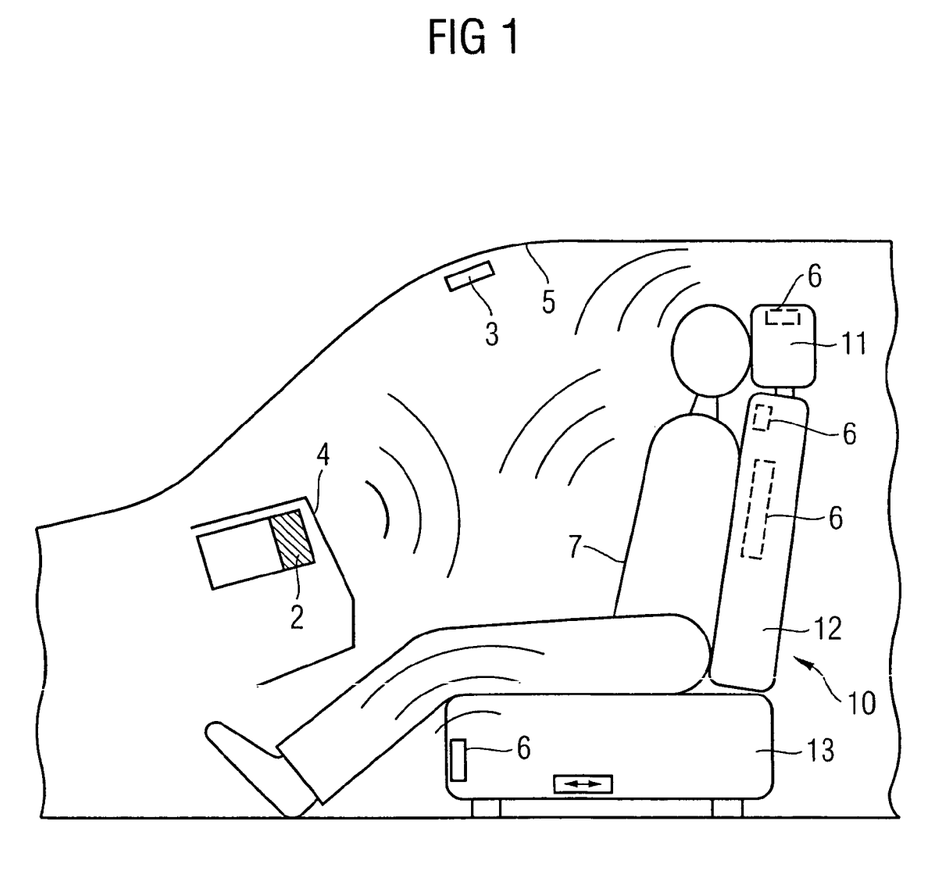
FIG. 1 shows a side view of a vehicle seat with a person seated thereon, with a device according to the invention.

Referring now to the figures of the drawing in detail and first, particularly, to FIG. 1 thereof, there is illustrated a device and method for detecting an object or a person on a seat in a means of transport is explained in detail below with reference to its use in a motor vehicle with persons representing the objects who are positioned on a seat in the vehicle.

A device of this kind has one or a plurality of transceivers 1, each with a high-frequency transmitter 2 and a high-frequency receiver 3 in the dashboard 4 (FIG. 1), in the central console, in the roof lining 5 and/or in the rear view mirror. A plurality of reflectors 6 in the seat 10 is arranged in the seat surface 13, the back rest 12 and/or the head rest 11. The reflectors 6 are advantageously arranged in the areas of seats 10 that are typically touched by a person 7 when seated on the seat 10, or the person 7 at least partially covers in respect of the high-frequency transmitter 2 by means of his/her body.

High-frequency signals directed to the motor vehicle seat 10 are transmitted by the high-frequency transmitters 2. These signals are immediately reflected by reflectors 6 in the seats 10, or reflected modulated with a code. The high-frequency receivers 3 receive the signals and analyze these based on the received intensity, the signal propagation delay and/or the code contained in the signal.

If a person 7 or an awkward object is located on a seat 10, they tend to cover the reflectors 6 at least partially, in other words, they lie in the radiation path between a transceiver 1 and at least one arranged reflector 6. High-frequency transmitters/high-frequency receivers 2, 3 and reflectors 6 are arranged in such a way that the direct transmission path between them normally goes through a person 7 on a seat 10. The high-frequency signals transmitted by the high-frequency transmitters 2 thus penetrate the body and are thereby more or less attenuated depending on the physical constitution.

The signals reflected back by the reflector 6 at least partially go through the body of the person 7 and are similarly attenuated, said signals thus reaching the high-frequency receivers 3 heavily attenuated. On the basis of the intensity, the signal propagation delay measurement and/or the codes reflected back (or information contained in the signal, such as for example an identifier), the distance between them can accurately determine whether a person 7 is located on the seat 10, and additionally, a triangulation method for example determines in which position he/she is found.

The reflectors 6 are advantageously operated as reflectors which add information to the signal to be reflected. The reflectors 6 can thus be clocked with, for example, a frequency of 32 kHz. This information is virtually 'modulated upon' the signal and transmitted back to the high-frequency receiver 3. Other information can also be added to the signals (in the form of a frequency, code etc), in order to detect from which reflector 6 a signal is received. With the aid of the identifier of the particular reflector 6 and/or the signal propagation delay measurement, other signals which reach the receiver 3 by means of multiple reflections remain unaccounted for during the evaluation.

In the event that a reflector 6 receives the high-frequency signals unattenuated, and the reflections therefrom reach the high-frequency receiver 3 extensively unattenuated, it is possible to determine that no person 7 is located in this area of the reflector 6. The radiation which goes through a human body is heavily attenuated (approximately 30 dB for a simple transit). When the attenuation lies at a magnitude of approximately 30 dB, it can be concluded that the signal has only gone through the body once. If on the other hand, the signal is attenuated at a magnitude of approximately 60 dB, it can be assumed, based on the high attenuation, that the signal has penetrated the body both before and after the reflection.

With objects, the returned intensity depends on the conductivity of the object. With non-conductive objects, hardly any attenuation takes place. On the basis of the information or identifier of the reflector 6, 26, it can thus be detected from where the received high-frequency signal originates. Highly conductive objects on the other hand reflect the high-frequency signal largely without any major loss. Nevertheless, these certainly shadow the reflectors 6, 26 at least partially, so that a signal containing information or an identifier returns only from some of the reflectors 6, 26. The conclusion can thus be made that an object is located on a seat 10.

The exact expansion of the body or object can be determined by many small reflectors 6 arranged in the seats 10 (head rest 11, back rest 12 and seat surface 13), since the positions of the reflectors 6 and of the transceivers 1 relative thereto is known.

Each reflector 6 can also have its own code, which is then transmitted back to the high-frequency receiver 3. This can then determine off which of the reflectors 6 a signal is reflected modulated. Even when signals are received which were previously multiply reflected off reflectors 6 and other objects in the motor vehicle, the signals can be unambiguously assigned to a reflector 6 based on the intensity and/or the signal propagation delay and/or the code.

What are known as backscatter can be used as reflectors 6. A distinction is made thereby between a passive backscatter, a semi-passive backscatter, a semi-active backscatter or an active backscatter.

A passive backscatter has a reflective surface. By means of an $\epsilon_R$ step (step of the relative permittivity $\epsilon_R$ or changes to the electrical conductivity), the field wave guide resistance has a step. A constant backscatter cross-section exists so that no modulation is effected (like a mirror).

A semi-passive backscatter similarly has a reflective surface. A temporary changeable backscatter cross-section is present (e.g. by means of a switch transistor). However, no signal increase or signal generation takes place during reflection.

The semi-active backscatter is similar to the semi-passive backscatter, but exhibits an increase of the signal to be reflected.

With an active backscatter, the signal to be reflected is generated in the backscatter. In addition, the active backscatter has its own oscillator, by means of which a phase coherent signal is radiated back.

Reflectors 6 of this kind can be configured simply and have small dimensions so that they can be arranged in any position, preferably in or on the back rest 12, in, on or under the seat surface 13 or in or on the head rest 11.

Since the high-frequency signals between the transceiver 1 and the one or a plurality of reflectors 6 are transferred immediately to and fro, the exact position of the seat 10 can be determined with the aid of one or a plurality of signal propagation delay measurements. Since the signals are heavily attenuated during their passage through a human body, even bending effects can be used to detect a forwardly displaced position of a person 7. By means of the diffraction of the signals or the high-frequency radiation, a part of the signals, however small, always succeeds in reaching the reflectors 6 only slightly attenuated. It to possible to determine how far forward a person 7 is bent based on the intensity which is received by the high-frequency receiver 3. The smallest physical forward displacement of the upper torso to be detected by a person 7 located on the seat 10 depends on the transmission frequency (wavelength) or the mounting depth of the reflectors 6 in the seats 10.

The angle of inclination or the forward displacement of the person 7 can be determined based on the intensity of the reflected signal. The higher the quantity of and the smaller the reflectors 6 used in the seats, the bigger the local triggering and the more precise the detection of the position of a person 7 or an object on the seats 10. A plurality of high-frequency receivers 3 can also be arranged in the seats in order to detect a more precise position.

This seat occupancy information and position information can be made available to other systems in the vehicle. These types of other systems can be an airbag system, a seat adjustment device which is matched to the individual settings of a user, a mirror adjustment device etc.

Preferably the high-frequency signals are transmitted at a frequency of 2.4 GHz. Naturally, other frequencies in the high-frequency range (433 MHz or 868 MHz) or microwave range (24 GHz) can be used, and can be transmitted with a type of intensity which is not harmful to humans.

High-frequency transmitters 2 and high-frequency receivers 3 need not necessarily be arranged at one location or in a common housing. The important aspect is that the high-frequency receiver 3 receives reflected high-frequency signals which were transmitted by a high-frequency transmitter 2 and where appropriate reflected off an object. The high-frequency signals received are routed to an internal evaluating unit 9, which then determines the seat occupancy and/or position of a person 7 on a vehicle seat 10.

A unidirectional transmission can be used in place of reflectors 6 to detect a seat position or seat occupancy. A high-frequency transmitter 2 or a high-frequency receiver 3 is thus positioned in the seat 10 while the complementary component is arranged on the vehicle side in such a way that under normal circumstances the transmission path goes through a body positioned on a seat 10. Since the evaluating unit 9 is connected non-interchangeably to the high-frequency transmitter 2 and the high-frequency receiver 3, its function corresponds to the identifier of reflectors 6. The position of the person 7 can then be determined precisely by means of both the received signal strength (intensity) and the signal propagation delay (distance)

With the device according to the invention, the transmitted and received signals which are transmitted by a high-frequency transmitter 2, attenuated or unattenuated, to a high-frequency receiver 3 through a body on a seat 10 (and if necessary reflected by a reflector 6) are evaluated based on the codes contained therein and/or their signal propagation delay and/or their intensity. It is thus possible to detect a person 7 or an awkward object on a seat 10 (preferably on the front seats of a motor vehicle).

It is possible to detect which seats are occupied based on the identifier or the coding of the reflectors 6, if a transceiver 1 radiates a plurality of seats with the high-frequency signals. Each seat 10 can be provided with its own transceiver 1 (i.e. a high-frequency transmitter 2 and a high-frequency receiver 3), the signals of which are only transmitted to specific seats 10 and reflectors 6 corresponding to the directional characteristics during transmitting and reflecting.

The position of the reflectors 6 or the high-frequency transmitter 2 or high-frequency receiver 3 in the seat 10 are selected in such a way that the high-frequency signal transmission path between the high-frequency transmitter 2 and high-frequency receiver 3 via a reflector 6, is covered as much as possible by the body of a person 7 on a seat 10 (the person 7 is thus detected on the seat 10).

Conventionally, many countries specify that at least the front seats in motor vehicle be equipped with a safety belt 20 (FIGS. 2A and 2B), by means of which persons 7 sitting on the seat 10 should be strapped-in during the journey, to avoid being thrown out of the seat 10 in the event of an accident.

The device according to the invention for detecting an object or a person 7 on a seat 10 of a means of transport comprises one or a plurality of belt sensors 25, 26, which detect whether or not an object or a person 7 is secured on a seat 10 by means of a safety belt 20. It may also be detected whether or not the safety belt 20 is actually being worn.

Figure 3:
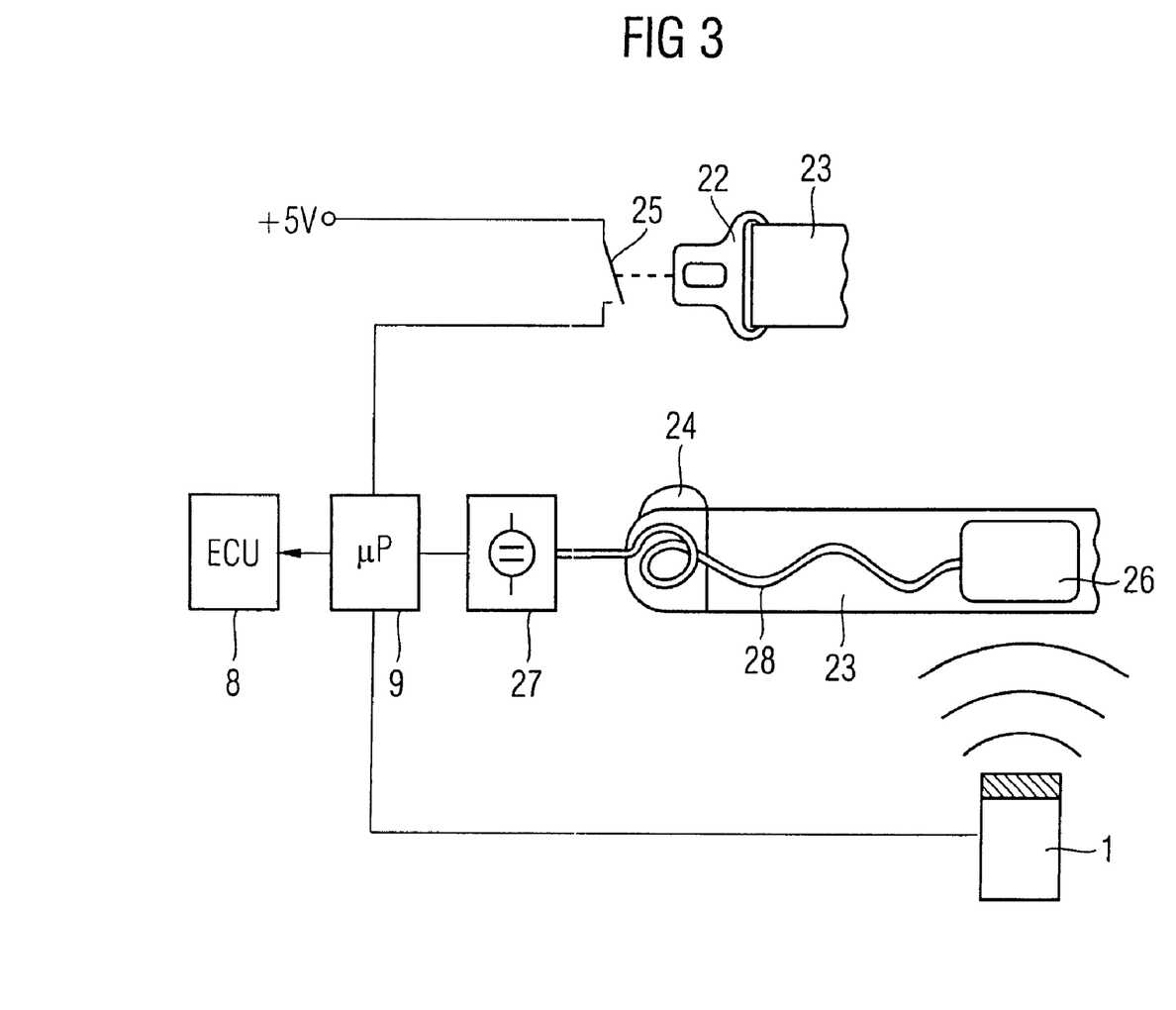
FIG. 3 shows a block diagram of the device according to the invention.

In the simplest of cases, the belt sensor 25, 26 is designed as a simple switch (also as known as a seat belt buckle switch 25, FIG. 3) which is disposed in the belt buckle 21 and switches once the belt clasp 22 is engaged into the belt buckle 21. The switch 25 is linked to the evaluating unit 9, which also effects the seat occupancy detection with the aid of the transceivers 1 and the reflectors 6. The belt sensor 25, 26 delivers a belt sensor signal to the evaluating unit 9, by means of which the evaluating unit 9 detects whether or not the safety belt is also engaged or being worn. It is thus also possible to detect whether or not a seat 10 is occupied and whether or not the safety belt 20 associated thereto is engaged.

In the event that the belt sensor 26 requires its own energy supply, this can be implemented by means of a voltage source, which is electrically connected to the reflector 26 by means of the belt buckle 21 or the belt suspension 24 (seat belt re-tractor) and a power supply cable 28 in the belt strap 23. Naturally, an inductive or capacitive, wireless energy supply is also possible.

Figure 2A:
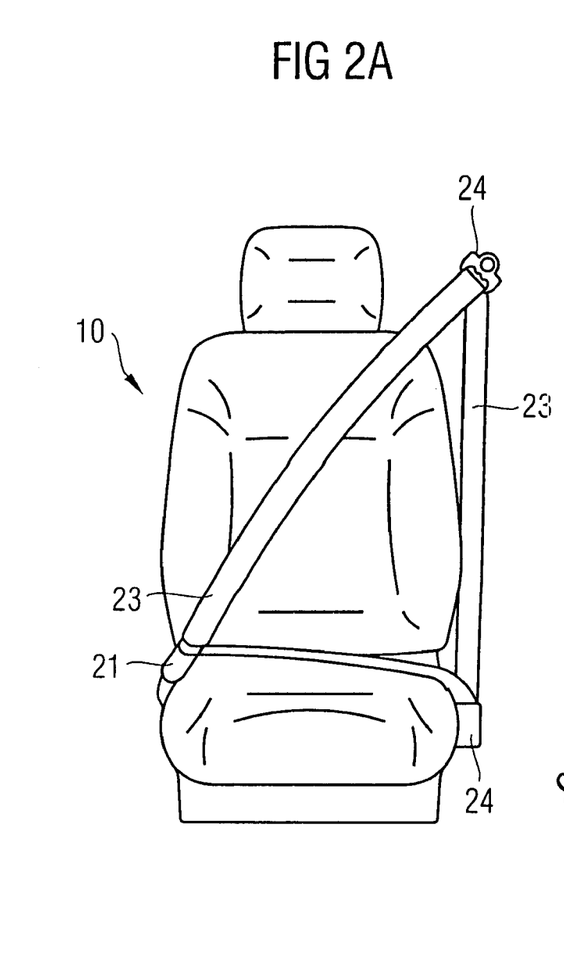
FIGS. 2A and 2B show vehicle seats each with a safety belt.

The situation can (irrationally) arise wherein a safety belt 20, as shown in FIG. 2A is engaged, but a person 7 is seated on the safety belt 20. In this case, the person is not secured by the safety belt 20. A seat belt buckle switch 25 alone could not detect whether a person 7 is seated on the safety belt 20, since the seat is occupied and the belt 20 is engaged. The seat belt buckle switch 25 would thus be activated.

Figure 2B:
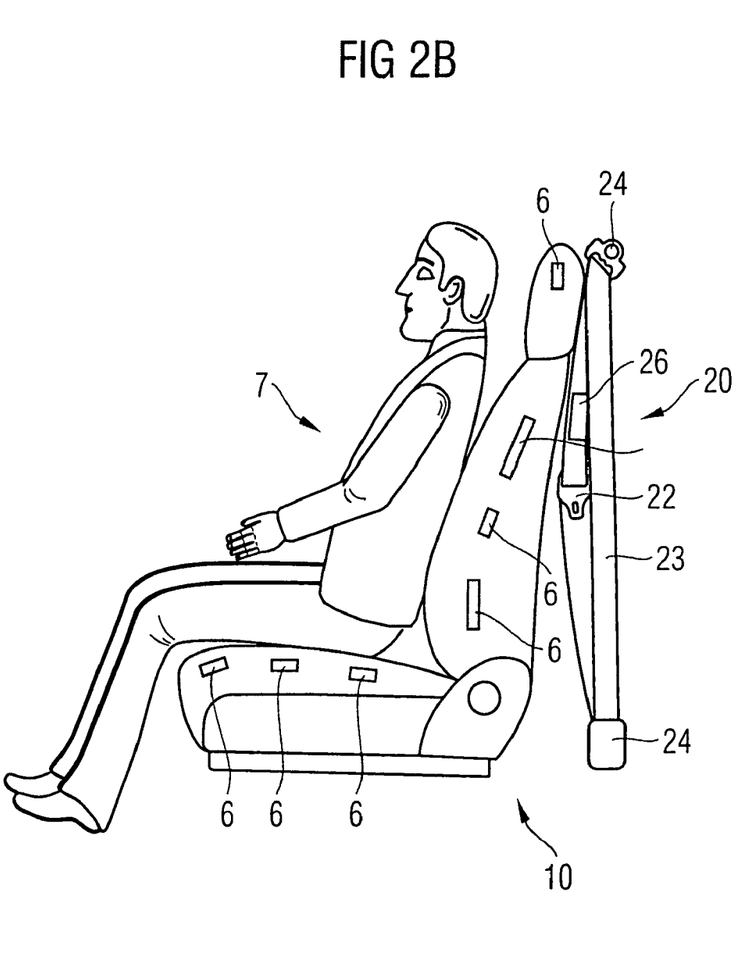

It would be a different case if the belt sensor 25, 25 is designed as one or a plurality of belt reflectors 26, which are arranged in the belt 20—for example by weaving metallic threads into the belt band 23. With the aid of the belt reflectors 26, which function identically to the reflectors 6 in the seats 10, the distance between the respective belt reflector 26 and the transceiver 1 can be determined. It is then obvious whether the belt 20 (as shown in FIG. 2B) is not worn, or the body of the person 7 secured and is thus worn. If a person 7 should be seated on an engaged safety belt 20, this is detected by means of an intensity measurement (and subsequent comparison of the received signal strength with the transmitted signal strength). The high-frequency signals transmitted by the high-frequency transmitter 2 then go firstly through the body to the belt sensors 26, and are reflected by these. Before the signals can reach the receiver 3, they once again go through the body of the person 7 located on the seat 10 and are once again attenuated. If the person 7 is correctly strapped-in, the signals would arrive at the receiver 3 essentially unattenuated. In addition, it is possible to detect by means of the seat belt buckle switch 25, whether or not the belt clasp 22 is actually engaged in the belt buckle 21.

If a plurality of belt reflectors 26 is arranged in the belt 20, a three dimensional image (3D image) of the belt operation can be determined, whereby, together with the position information of the person 7 or the object, the external circumferential measurements of the person 7 or the object and the belt extraction length can be more accurately determined. Combinations of seat belt buckle switch 25 and belt reflectors 26 can also be used, to improve the functionality of the device and thus provide a more accurate detection of a strapped-in person 7.

The information regarding which seat 10 is occupied and whether the person 7 or the objects on the seat 10 are secured using a safety belt 20, can be fed to a central control device 8 (ECU=Electronic Control Unit) by means of the evaluating unit 9, with an optical and/or acoustic display. A bus driver is thus for example able to detect whether or not all of his passengers have fastened their seat belts, or whether his passengers have incorrectly fastened their seat belts 20. The display can result by means of a voice, an acoustic signal (alerting tone) or graphically by means of a display. The driver can be issued with an acoustic or optical belt warning if a person 7 is not correctly strapped into a particular seat 10.

The high-frequency receiver 3 and the evaluating unit 9 connected thereto can feed the information to added-feature comfort control system in the motor vehicle, whereby at least one vehicle-specific function can be controlled depending on the presence of a person 7 or an object on a seat 10 and/or depending on the fastened safety belt 20. A passive restraint system (airbag) can thus be controlled depending on the seat occupancy information and the safety belt information (if a person is not strapped in, the corresponding associated airbag cannot trigger due to high risk of injury).

The information can also be used for an access control system and motor start system, for example to prevent the doors from locking when a person is still strapped-in on a seat 10, whilst the driver leaves the vehicle. A start release could then only be issued if a person 7 is strapped in on the driver's seat.

Figure 4:
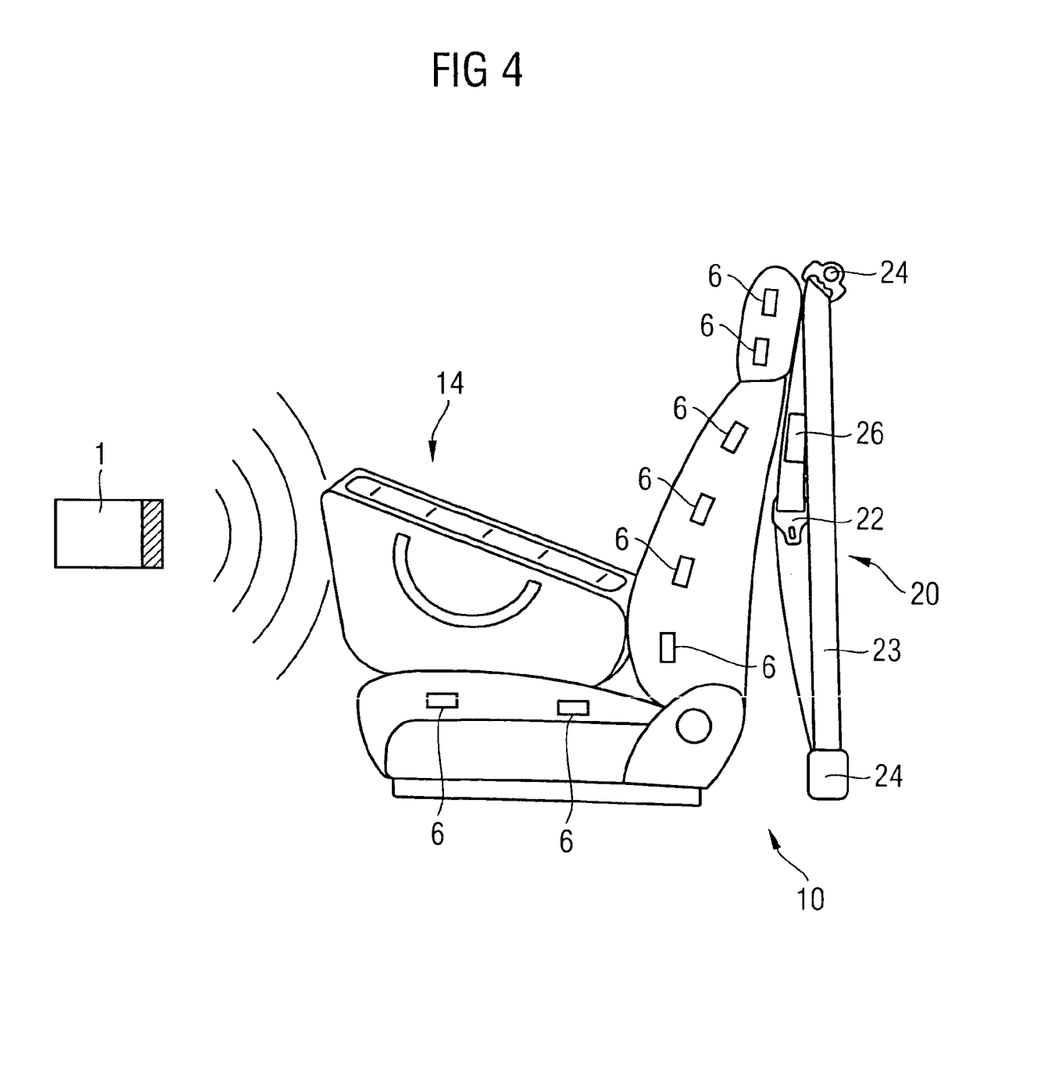
FIG. 4 shows a side view of a vehicle seat with a baby seat.

This device can also detect whether objects are secured on the seats 10 or at specific places in the vehicle by means of a belt 20. FIG. 4 represents a child seat or a baby seat as an object which is found on a seat 10. The transceiver 1 and reflectors 6 can detect that a small object is located on the seat 10. By querying the belt reflectors 26, it is possible to detect with the exemplary embodiment according to FIG. 4 that the baby seat is not secured on the seat 10 by the safety belt 20. The driver is thus issued a warning when the engine is turned on.

Figure 5:
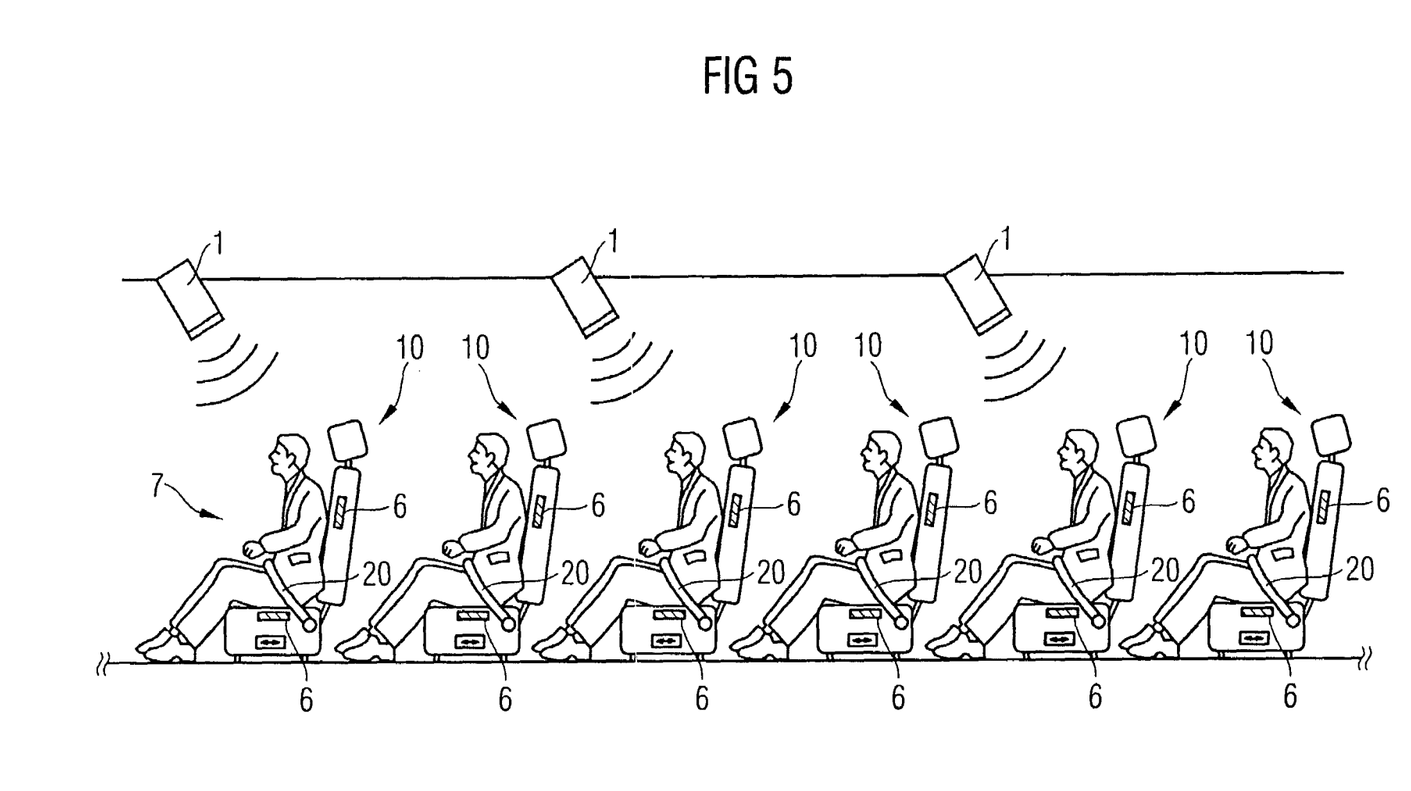
FIG. 5 shows a side view of a row of seats in a vehicle, such as a bus or an aircraft.

FIG. 5 illustrates an exemplary embodiment of the device for a bus. It shows part of a row of seats with several seats 10 on which a person 7 has sat down. A plurality of seat rows can be arranged in parallel to one another—like in a bus.

The persons 7 are strapped-in with safety belts 20 (illustrated by lap belts, as are currently customary in aircraft). The seat occupancy can be detected by means of transceivers 1 arranged on one or a plurality of seats 10, as well as correlating reflectors 6 in the seats 10. By means of belt reflectors 26 or seat belt buckle switches 25 it is possible to determine which persons are actually strapped-in. Thus bus drivers can detect using their display unit in the cab whether or not all passengers are strapped-in.

This embodiment can also be used with aircraft, where similar circumstances relating to seats and mandatory seat belt use pertain, at least during take-off and landing (or in the case of turbulence during the flight). A flight attendant can detect on a display unit in the service area whether all passengers are strapped in, without having to go through all the rows of seats and carry out a time-consuming visual inspection.

In buses and aircraft, it is sufficient that the person 7 lies precisely in the radiation path between the transmitter 2 and reflector 6 and/or reflector 6 and receiver 3, if an individual reflector 6 per seat 10 is arranged in such a position in the seat 10. The reflector 6 is thus guaranteed to be covered by the seated person 7, and the seat occupancy can thus be automatically detected.

To prevent the reflected signals from mutually overlapping and becoming subject to interference when the reflectors 6 and belt reflectors 26 are queried, it is advantageous that each reflector 6 responds with its own frequency. To prevent interference sources from impairing measurement of individual frequencies, and from addressing several reflectors 6, the high-frequency signals within a transmission channel are transmitted broadband, in a modulated form. By way of example, the first group of reflectors 6 can be designed in such a way that they reflect the high-frequency signals at a modulation frequency of 0–20 MHz, the second group reflecting the high-frequency signals at a frequency of 20 MHz to 40 MHz, etc., said high-frequency signals being transmitted broadband in a modulated form at a carrier frequency of approximately 2.4 GHz. Broadband modulated thus signifies that the transmission channel for example, can be 80 MHz wide at 2.4 GHz. If for example, four high-frequency transmitters 2 are present, each of the high-frequency transmitters 2 can transmit transmission signals continuously or in stages within 20 MHz at an increasing (sweep) or decreasing frequency, so that the first high-frequency transmitter 2 can transmit a plurality of signals with modified frequencies within the bandwidth of the permitted transmission channel, from 0 to 20 MHz, the next from 20 to 40 MHz, etc.

The signals can also be transmitted in different transmission channels, with different carrier frequencies, in order to avoid interference during the signal transmission.

Frequency multiplex methods (graduated depending on the frequency), time multiplex methods (graduated time-related) or mixed methods can be used for transmitting and receiving. This ensures that the seat occupancy and the information relating to the engaged safety belt 20 can be obtained accurately from each individual seat position.

The reflectors 6 can be fashioned in such a manner, that they send the high-frequency signals back in differing polarized forms. A first reflector 6 could thus send the high-frequency signal back at a polarization angle of 0° and a second reflector could send its high-frequency signal back at a polarization angle of 90°. An elliptical or circular polarization would also be possible as long as the high-frequency receiver 3 can unambiguously and distinguishably receive these signals.

High-frequency transmitter 2 and high-frequency receiver 3 can be arranged individually or as a common transceiver 1 on the vehicle interior, the A-pillar, the B-pillar (with vans in each or only one pillar), on the pillars between the windows in a bus, on the dashboard 4, on the seats 10, in the rear view mirror, on the roof or the ceiling or on any other suitable place in the vehicle. The reflectors 6 can be arranged on or in the seats 10, adjacent to the seats 10 or under as well as behind the seats 10 in such a way that a possible object or person 7 located on a seat 10 lies between the transceiver 1 and the reflector 6. The belt reflectors 26 can subsequently be applied to the belt material or into the belt material, for example by weaving metallic conductors.

An energy saving device is made available with the device according to the invention, by means of which position detection and seat occupancy detection can be effected very rapidly (even within a few milliseconds).

The terms "vehicle" and "means of transport" is to be understood here as any type of conveyance, such as motor vehicles (cars, heavy goods vehicles, buses), rail vehicles, maglev trains, cable railway, or chair lifts, aircraft and ships, in which persons 7 can sit on a seat 10, and in which advantageously personal safety is also ensured during the journey by means of a safety belt. Objects can also be detected on seats 10 or predetermined places, wherein the objects such as for example, child seats or packages are secured with a safety belt 20 on the seat 10. Instead of on seats 10, persons 7 or objects can also be secured on other functionally equivalent objects during the journey using safety belts.

The term "object" in a generic sense, includes inanimate and animate objects, and, in particular persons.

The safety belts 20 can be designed as follows; as a two-point belt (conventionally a lap belt or a bias belt), as a three-point belt (like in motor vehicles, typically with two lower and one upper belt suspension 24 or a belt catch), as a four-point belt (known as suspenders), as a five-point belt (combination of two and three point belt) or in other suitable forms. The belts ensure that a person, an object or goods are secured on a seat throughout the journey. All strap-in systems and restraint belts can therefore be used which secure a person or an object.

The term "identifiers" of the reflectors 6, 26 can be understood to include reflectors 6, 26 which are clocked at a frequency of 32 kHz for example, characteristic information thereby being added to the signal to the high-frequency receiver 3, which identifies the respective reflector 6, 26 or makes it possible to detect that the signal comes from this reflector 6, 26. The reflectors 6, 26 can also encode the received high-frequency signals and send them back. The reflectors then similarly have characteristic identifiers or characteristic information which they issue to the reflected signal.

We claim:

1. A device for detecting an object on a seat of a vehicle, the device comprising:
   at least one high-frequency transmitter disposed in vicinity of the seat and configured to transmit high-frequency signals;
   one or a plurality of reflectors for reflecting high-frequency signals disposed in or on the seat to cause the high-frequency signals to traverse an object on the seat at least partially attenuated;
   a high-frequency receiver disposed to receive the high-frequency signals after reflection at one of said reflectors;
   an evaluating unit connected to said high-frequency transmitter and to said high-frequency receiver and configured to determine information concerning an occupancy of the seat from at least two of the following: a signal propagation delay between transmitting and receiving, information contained in the high-frequency signals, and a received signal strength;

a safety belt disposed to secure the object on the seat; and
a belt sensor connected to said evaluating unit, said belt sensor enabling a detection whether or not said safety belt has been fastened.

2. The device according to claim 1, wherein said belt sensor is a seat belt buckle switch in a belt buckle of said safety belt, and said buckle switch is activated by engaging a belt clasp in the belt buckle.

3. The device according to claim 1, wherein said belt sensor is a belt reflector disposed on or in said safety belt.

4. The device according to claim 1, wherein said high-frequency transmitter and said high-frequency receiver are implemented in a common unit forming a transceiver.

5. The device according to claim 1, which further comprises a display device connected to said evaluating unit, for displaying whether or which seats are occupied and/or whether or not the safety belts are being worn.

6. The device according to claim 1, wherein said high-frequency transmitter and said high-frequency receiver and said evaluating unit connected thereto form a part of an added-feature control system in a motor vehicle, wherein at least one vehicle-specific function is controlled depending on at least one of a determined presence of an object on a seat and a fastened safety belt.

7. The device according to claim 1, wherein said reflectors include a first reflector disposed on a first seat and a second reflector disposed on a second seat, said reflectors are configured to reflect the high-frequency signals with information enabling said evaluating unit to determine whether the reflected signal originates from said first reflector or from said second reflector.

8. The device according to claim 7, wherein said first reflector is disposed in or on a first seat and said second reflector is disposed in or on a second seat of the vehicle.

9. A method of detecting an object on a seat of a vehicle, the method which comprises:
transmitting high-frequency signals with a high-frequency transmitter and receiving the signals with a high-frequency receiver and causing the high-frequency signals to at least partially traverse the object located on the seat and to thereby attenuate the signal;
determining an occupancy of the seat from at least two items of information selected from a signal propagation delay between transmitting and receiving, an information contained in the high-frequency signals, and a signal strength of a received signal; and
detecting from a belt sensor signal whether or not the seat belt is fastened if the seat has been determined to be occupied.

10. The method according to claim 9, which comprises transmitting the signals directly from the transmitter to the receiver substantially without reflecting the signals.

11. The method according to claim 9, which comprises reflecting the signals with a reflector between the high-frequency transmitter and the high-frequency receiver and imparting on the signals a reflector-specific characteristic identifier enabling a control unit connected to the receiver to determine the reflector from which the signal was reflected.

12. The method according to claim 9, which comprises reflecting the signals with a plurality of reflectors between the high-frequency transmitter and the high-frequency receiver.

13. A method of detecting an object on a seat of a vehicle, the method which comprises:
transmitting high-frequency signals with a high-frequency transmitter broadband in modulated form;
reflecting the signals with each of a plurality of reflectors or a group of reflectors between the high-frequency transmitter and the high-frequency receiver with a predefined frequency;
receiving the signals with a high-frequency receiver and determining an occupancy of the seat from at least one item of information consisting of a signal propagation delay between transmitting and receiving, an information contained in the high-frequency signals, and a signal strength of a received signal; and
if the seat has been determined to be occupied, detecting from a belt sensor signal whether or not the seat belt is fastened.

14. A method of detecting an object on a seat of a vehicle, the method which comprises:
transmitting signals with a plurality of high-frequency transmitters, and transmitting the signals in different transmission channels at different modulation frequencies or temporally graduated;
receiving the signals with a high-frequency receiver and determining an occupancy of the seat from at least one item of information consisting of a signal propagation delay between transmitting and receiving, an information contained in the high-frequency signals, and a signal strength of a received signal; and
if the seat has been determined to be occupied, detecting from a belt sensor signal whether or not the seat belt is fastened.

15. A method of detecting an object on a seat of a vehicle, the method which comprises:
transmitting high-frequency signals with a high-frequency transmitter, reflecting the signals with a plurality of reflectors between the high-frequency transmitter and a high-frequency receiver, and receiving the signals with the high-frequency receiver and causing the high-frequency signals to at least partially traverse the object located on the seat and to thereby attenuate the signal;
reflecting the signals in differing polarized forms with the reflectors, and receiving the high-frequency signals in differently polarized form with the high-frequency receivers.

* * * * *